(12) United States Patent
Friggstad

(10) Patent No.: US 8,001,915 B2
(45) Date of Patent: Aug. 23, 2011

(54) METERING SYSTEM FOR AGRICULTURAL IMPLEMENT AND HAVING SECTIONAL CONTROL

(75) Inventor: Terrance A. Friggstad, Grasswood (CA)

(73) Assignee: CNH Canada, Ltd. (CA)

( * ) Notice: Subject to any disclaimer, the term of this patent is extended or adjusted under 35 U.S.C. 154(b) by 13 days.

(21) Appl. No.: 12/274,898

(22) Filed: Nov. 20, 2008

(65) Prior Publication Data

US 2009/0314191 A1 Dec. 24, 2009

Related U.S. Application Data

(60) Provisional application No. 61/073,573, filed on Jun. 18, 2008.

(51) Int. Cl.
*A01C 7/00* (2006.01)
*A01C 9/00* (2006.01)

(52) U.S. Cl. ........................................ 111/178; 111/900

(58) Field of Classification Search .......... 111/170–188, 111/900
See application file for complete search history.

(56) References Cited

U.S. PATENT DOCUMENTS

| | | | | |
|---|---|---|---|---|
| 3,121,515 | A | * | 2/1964 | Johnson et al. ............... 222/317 |
| 4,453,866 | A | * | 6/1984 | Ryan .............................. 406/70 |
| 4,609,151 | A | * | 9/1986 | Crowley ........................ 239/656 |
| 5,740,746 | A |   | 4/1998 | Ledermann et al. |
| 5,857,588 | A | * | 1/1999 | Kasper .......................... 221/274 |
| 5,974,988 | A |   | 11/1999 | Stufflebeam et al. |
| 2001/0013309 | A1 | * | 8/2001 | Mayerle et al. .............. 111/174 |
| 2006/0255189 | A1 | * | 11/2006 | Niemela et al. .............. 239/672 |
| 2008/0229987 | A1 | * | 9/2008 | Dryden ......................... 111/178 |

* cited by examiner

*Primary Examiner* — Christopher J. Novosad
(74) *Attorney, Agent, or Firm* — Rebecca Henkel

(57) ABSTRACT

A particulate metering system includes a set of blocking members that can be independently controlled to block or allow the flow of particulate material to a roller assembly that collects the particulate material and releases the material to a series of distribution channels.

9 Claims, 5 Drawing Sheets

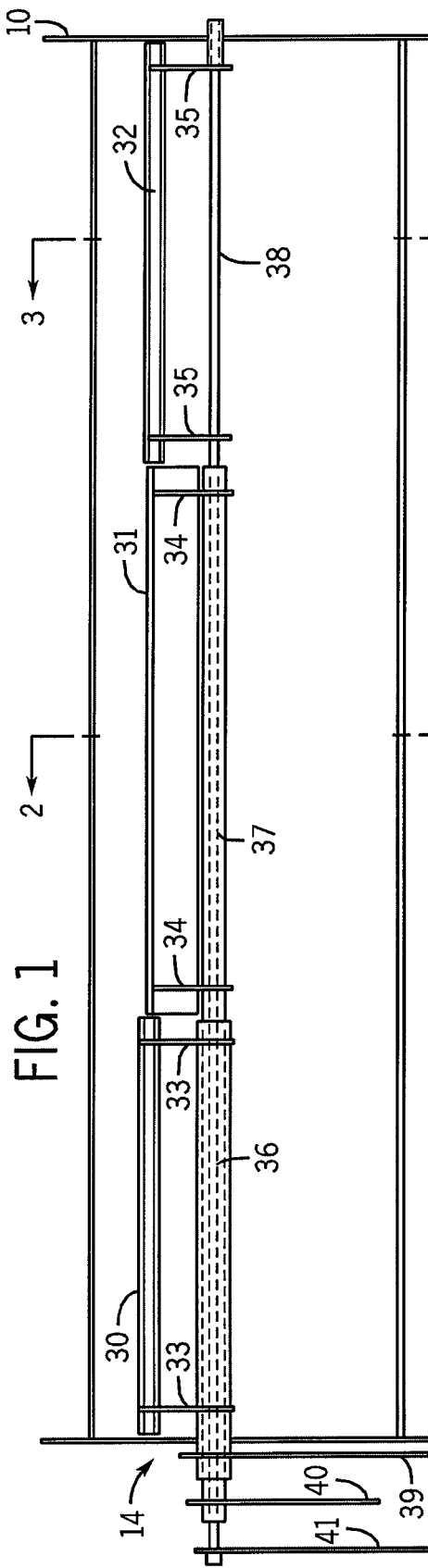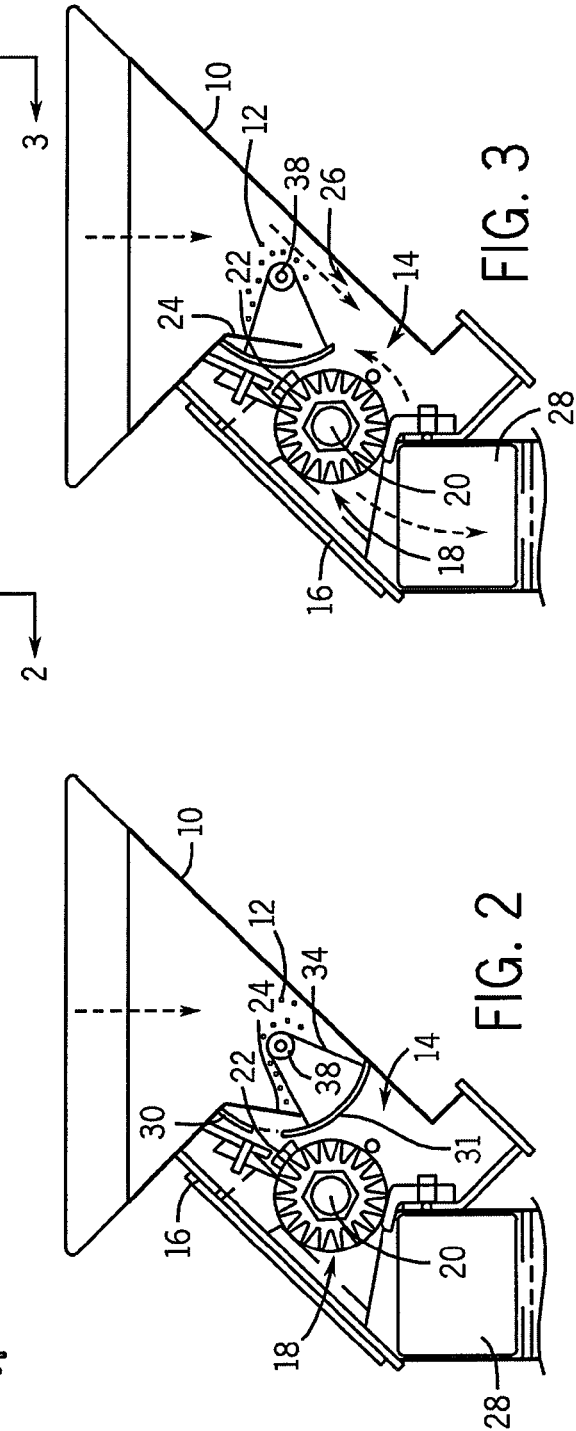

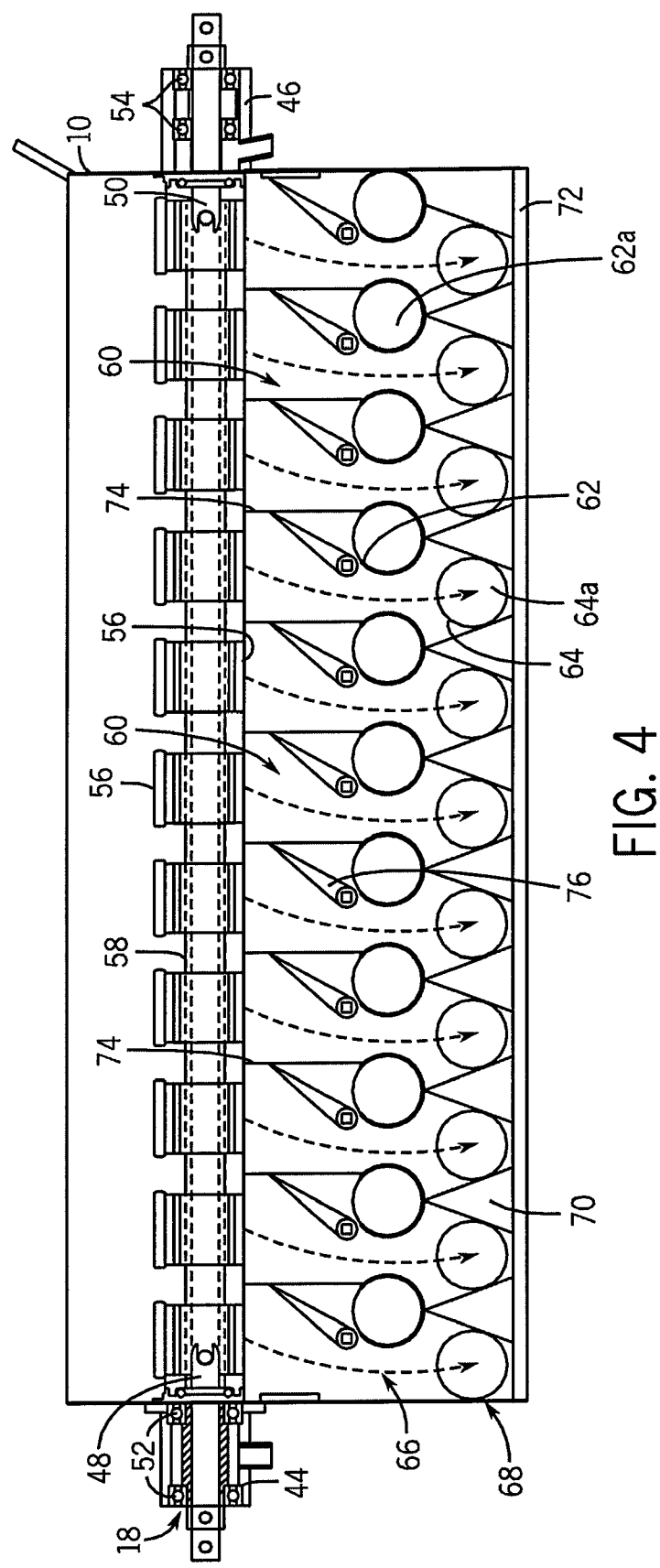

METERING SYSTEM FOR AGRICULTURAL IMPLEMENT AND HAVING SECTIONAL CONTROL

CROSS-REFERENCE TO RELATED APPLICATION

The present application claims the benefit of U.S. Ser. No. 61/073,573, filed Jun. 18, 2008, entitled "Seed Metering System for Agricultural Implement and Having Sectional Control", the disclosure of which is incorporated herein in its entirety by reference.

FIELD OF THE INVENTION

The present invention relates generally to agricultural implements, and in particular, to a seed metering system for an agricultural implement and having sectional control.

BACKGROUND OF THE INVENTION

Agricultural planting and granular fertilizing implements commonly employ an air metering system to control the deposition of granular material onto a farm field. An exemplary seed metering system is described in U.S. Pat. No. 5,974,988, the disclosure of which is incorporated herein by reference.

In general, air seed metering systems include a fluted roller that feeds granular material, such as seed, fertilizer, or other chemicals, stored in a hopper to a series of equidistantly spaced seed tubes that deposit the granular materials in equally spaced rows.

Increasingly, seeding and fertilizing implements are being designed to provide greater coverage. This is typically achieved by increasing the number of seed tubes thereby increasing the overall width of the implement itself. In some circumstances however, it is not desirable to have this increased coverage width. For example, when seeding or fertilizing a narrow strip, the increased coverage provided by such wider implements can result in over-seeding and, as a result, a waste of product.

Thus, some air metering systems employ rollers that are segmented into two sections. For full coverage, both sections are rotated in tandem. For half coverage, one of the rollers is locked and thus not rotated. Typically, relatively costly bearings and clutching is needed to allow one section to rotate while preventing the other section from rotating. In addition, costly sealing is required to prevent premature corrosion of the bearing and clutching components from exposure to corrosive fertilizer and other chemicals.

SUMMARY OF THE INVENTION

The present invention is directed to a seed metering system having sectional control that overcomes the aforementioned drawbacks. The seed metering system includes independently controllable gates that effectively close off the supply of granular material to selected sections of the fluted roller to prevent the flow of granular product into the flutes.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings:

FIG. 1 is a front elevation view of a particulate metering system for use with an agricultural implement according to one embodiment of the present invention;

FIG. 2 is a section view of the particulate metering system of FIG. 1 taken along line 2-2 of FIG. 1;

FIG. 3 is a section view of the particulate metering system of FIG. 1 taken along line 3-3 of FIG. 1;

FIG. 4 is a section view of a roller assembly of the particulate metering system of FIG. 1 and a particulate distribution system shown limiting distribution of particulate to a limited set of distribution channels of the distribution system according to one embodiment of the invention;

DETAILED DESCRIPTION OF THE PREFERRED EMBODIMENTS

Figure 5:
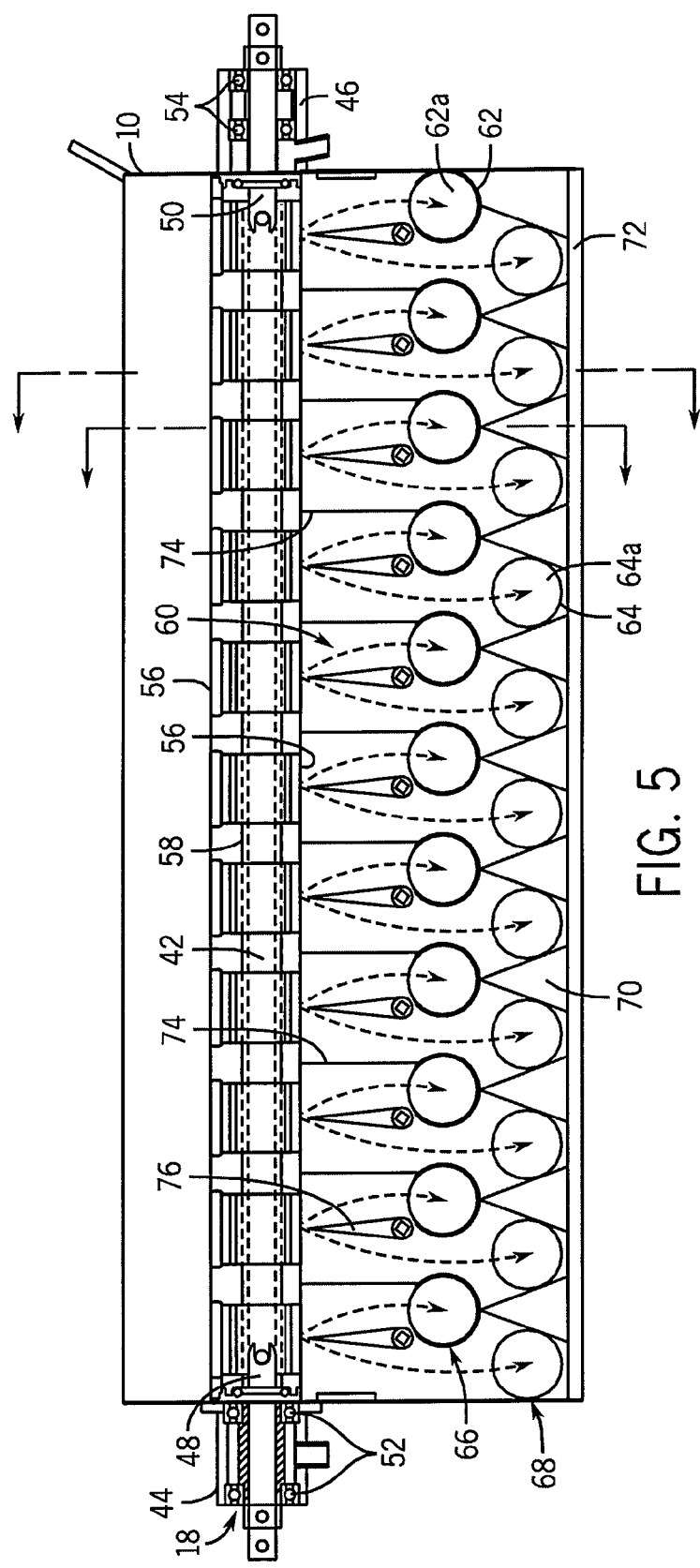
FIG. 5 is section view similar to that of FIG. 4 with the particulate distribution system allowing distribution of particulate by a full set of distribution channels.

Referring now to FIGS. 1-3, an agricultural implement includes a hopper 10 adapted to hold granular product 12, such as seed, fertilizer, or other granular chemicals, that is deposited onto a farm field or other surface by a seed metering system 14. The seed metering system 14 includes a housing 16 containing a meter roller 18. The meter roller 18 rotates about axis 20 that extends generally perpendicular to a path of travel of the agricultural implement. It is understood that axis 20 could be oriented at other angles relative to the path of travel. The seed metering system 14 includes a cut-off member 22 that prevents excess granular material from being carried by the roller 18. A fixed member 24 or dam extends from a wall of the hopper 10 and together with an opposite wall of the hopper defines an opening 26 through which the granular material 12 passes as it is presented to the roller 18. As the roller 18 rotates it "grabs" the granular material being fed to the opening 26 and as it continues to rotate it releases the granular material into a series of seed distribution channels, e.g., tubes 28, downstream of the roller 18.

To provide sectional control, the seed metering system 14 includes a set of shut-off gates 30, 31, 32 that are each connected to respective pairs of lever arms 33, 34, 35. The gates 30, 31, 32 are generally arcuate or semi-circular in shape and are rotated by respective elements 36, 37, 38 that are each, in turn, coupled to a respective control arm 39, 40, 41. As shown in FIG. 1, shaft 38 extends the width of the hopper 10. Tube 37 extends approximately two-thirds the width of the hopper 10, and tube 36 extends approximately one-third the width of the hopper. One skilled in the art will appreciate that these relative lengths are merely exemplary and, as such, the invention is not so limited.

As further shown in FIG. 1, tube 38 is concentric to tube 37 which in turn is concentric to shaft 36. This concentricity allows the elements 36, 37, 38 to be rotated independently of one another via their respective control arms 41, 40, 39. Thus, particulate distribution can be controlled by limiting the feeding of particulate to the distribution tubes 28 disposed generally about a width of the hopper 10.

In FIGS. 1-3, gate 31 is shown in a CLOSED position that prevents particulate material being fed to a central set of distribution tubes, whereas gates 30, 32 are shown in a retracted OPEN position thereby allowing particulate to be fed to two sets of outer distribution tubes.

It is understood that other types of arrangements may be used to control the actuation of the gates 30, 31, 32. For example, the elements 36, 37, 38 may be interlinked such that a single control arm (not shown) may be used to sequentially open and close the gates using a single shaft, e.g., shaft 38, to which all of the gates are connected.

Referring now to FIG. 4, the roller 18 consists of a series of fluted sections integrated with a tube 58 that is pinned to a pair of drive hubs 44, 46 by stub shafts 48 and 50. Between fluted sections 56 are smooth sections (not shown) that do not catch and dispense material, but instead provide a rotary seal surface to isolate each metering section. Slots in the end of stub shafts 48 and 50 engage cross-pins in each end of tube 58 of the roller assembly allowing it to be driven from either end. Drive hub 44 includes bearings 52 that allow the drive shaft 48 to rotate. Similarly, drive hub 46 includes bearings 54 that allow the drive shaft 50 to rotate. In one preferred embodiment, only one of the drive shafts is directly driven by a drive motor (not shown) and the other drive shaft is thus indirectly driven. By sliding stub shafts 48 and 50 outwardly, the roller assembly is disengaged and can be removed for maintenance or inspection.

The roller 18 further includes a set of cups 56 linearly spaced from one another along a tube 58. The tube 58 is rotated about axis 20 such that the cups "grab" particulate material, such as seed or fertilizer, contained in the hopper 10. Each cup is aligned with a distribution channel 60 and, as such, collects the particulate material during rotation of the meter roller 18 and the collected particulate material is then gravitationally released into the respective channel 60 as the tube 58 continues to rotate. In a preferred embodiment, cups 56 are radially spaced around the tube 58 such that each distribution channel 60 is associated with multiple cups. It is understood that the cups could take the form of openings, recesses, flutes, depressions, or other collection means formed in or associated with the tube 58.

Each distribution channel 60 has a pair of distribution tubes 62, 64 through which the particulate material passes for deposition onto the planting surface. As illustrated in FIG. 4, in a preferred embodiment, the inlets 62a, 64a to the distribution tubes 62, 64, respectively, are vertically offset from one another and slightly laterally offset from one another. This orientation of the inlets 62a, 64a provides two rows of inlets along the width of the hopper 10 that are staggered with respect to one another to define an upper row 66 and a lower row 68. Adjacent inlets 64a of the lower row are spaced from another by a block 70 that extends upwardly from a lower end 72 of the hopper 10. Each channel 60 is defined by walls 74 spaced from one another and extending downwardly toward the inlets 62a from the roller 18. In this regard, the particulate collected and released by a cup 56 will be deposited into inlet 62a or 64a associated with that cup 56.

A diverter 76 is associated with each channel 60 and is positioned downstream of the cup 60 associated with the channel 60 but is upstream of the inlet 62a for the distribution tube 62. The diverter 76 may pivoted to one of three positions to control the flow of particulate material to the distribution tubes 62, 64. In one position, shown in FIG. 4, the diverters 76 are pivoted to the right to block the flow of particulate material to the inlets 62a but allow the flow of particulate material to the inlets 64a.

In FIG. 5, the diverters 76 are shown pivoted to a neutral position whereby particulate material is free to flow around the diverter to both inlets 62a, 64a. Preferably, when the diverter 76 in the neutral position, the particulate material released by the cup 56 is generally split such that the amount of particulate material fed to inlet 62a is equal to the amount that is fed to inlet 64a.

Figure 6:
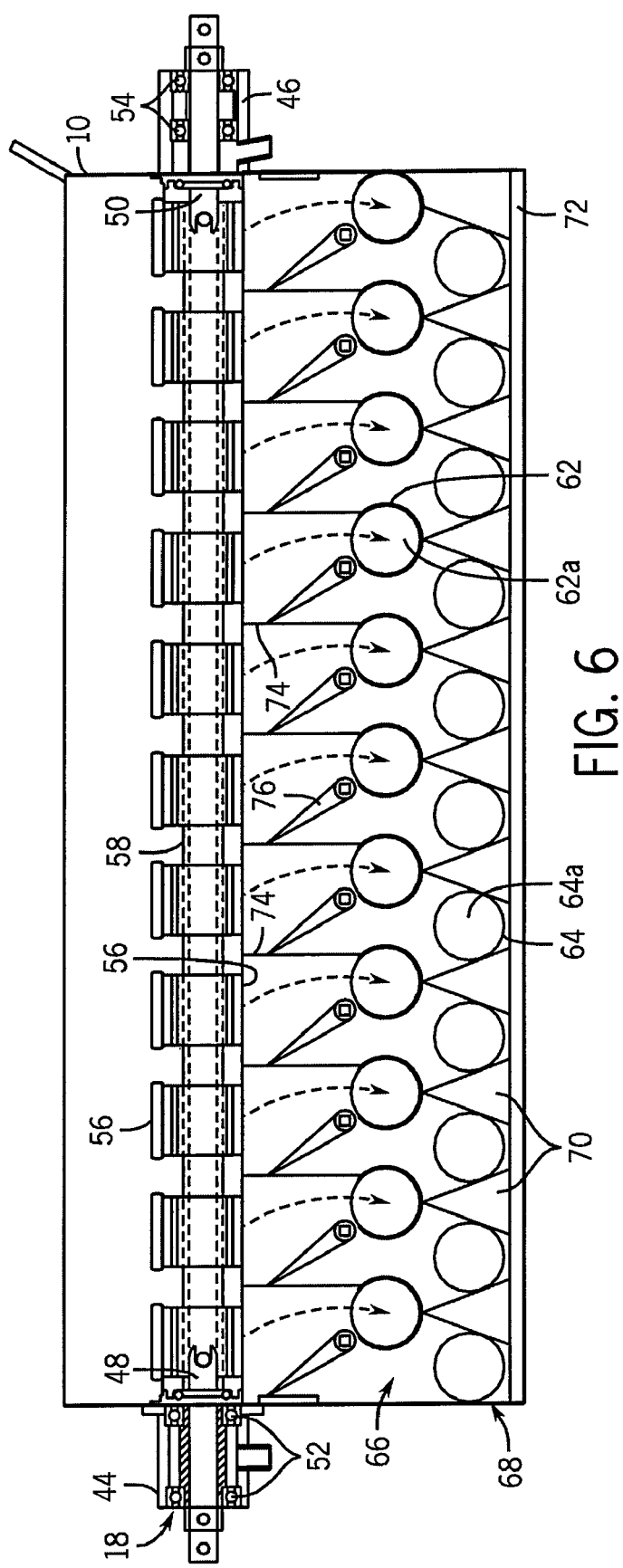
FIG. 6 is a section view similar to that of FIGS. 4 and 5 with the particular distribution system allowing particulate distribution to another limited set of distribution channels.

In FIG. 6, the diverters 76 are shown pivoted to the left to block the flow of particulate material to inlets 64a but allow the flow of material to the inlets 62a.

It will be understand that a forced air assembly may be associated with the distribution system described above as known in the art to force particulate material through the distribution tubes.

Figure 7:
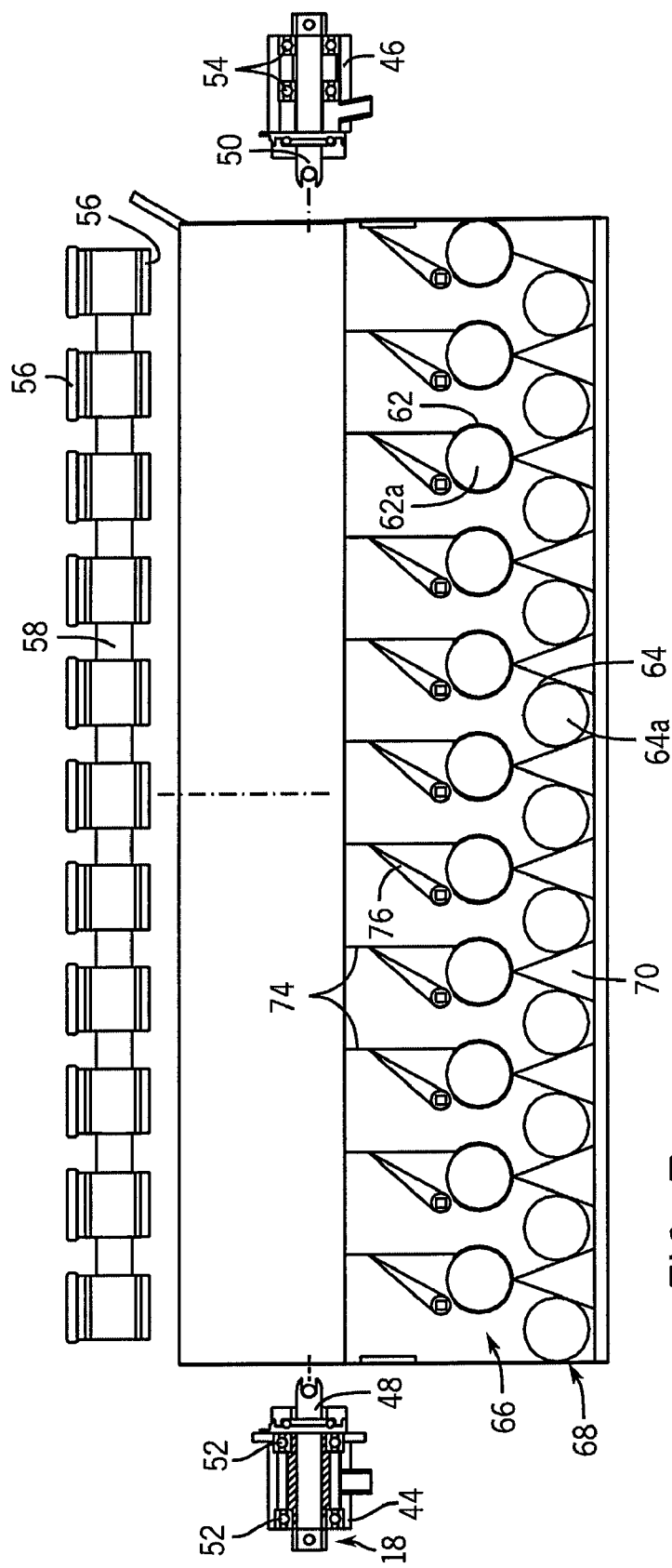
FIG. 7 is a partial exploded view of the particulate metering and particulate distribution systems.

Referring now to FIG. 7, the construction of the roller assembly 18 allows the roller 18 to be replaced, as needed. More particularly, the drive shafts 48, 50 may be decoupled from respective ends of the tube 58. When the stub shafts 48 and 50 are slid outwardly they thereby allow a user to remove the tube 58 and the cups 56 associated therewith from the hopper 10 for repair or replacement.

It will be appreciated that the present invention provides metering and distribution systems that cooperate to allow a user to provide both sectional control as well as density/concentration control. Through independent movement of the gates 30, 31, 32 the width of coverage may be controlled. The diverters 76 provide control of the amount or concentration of material that is deposited in a given row along the planting surface.

Many changes and modifications could be made to the invention without departing from the spirit thereof. The scope of these changes will become apparent from the appended claims.

I claim:

1. A granular material metering system for use with an agricultural implement including a product container and a series of spaced dispensing units, comprising:
    a product dispensing assembly configured to meter product from the product container to the set of spaced dispensing units, the product dispensing assembly including first and second sets of product ports that feed product to the set of spaced dispensing units; and
    a shut-off assembly including:
        a first movable arm disposed between the product container and the first set of product ports, the first movable arm configured to selectively open and close a path between the first set of product ports and the product container to prevent product from flowing through the first set of product ports to a corresponding first set of spaced dispensing units;
        a second movable arm disposed between the product container and the second set of product ports and being movable independent of the first movable arm, the second movable arm configured to selectively open and close a path between the second set product ports and the product container to prevent product from flowing through the second set of product ports to a corresponding second set of spaced dispensing units.

2. The system of claim 1 wherein the product dispensing assembly includes a roller associated with the product container and configured to rotate to deliver product from the product container to the first and second sets of spaced dispensing units and wherein each set of product ports includes sections of the roller with each section aligned with a respective one of the spaced dispensing units.

3. The system of claim 2 further comprising a pair of levers with each lever connected to a respective one of the first and second arms, the levers adapted to pivot the first and second arms to selectively open and close the paths between the product container and the product ports.

4. The system of claim 1 wherein the first movable arm is configured to pivot behind a portion of the container when moved to a position that opens the path.

5. A method of limiting deposition of product on a planting surface in which a roller having a series of openings formed therein feeds product from a product container to a series of dispensing tubes, the method comprising:
   receiving a first input to one of a first lever and a second lever, the first lever associated with a first gate and the second lever associated with a second gate; and
   pivoting the one of the first gate and the second gate in response to the first input to temporarily close access to a selected first number of openings of the roller to limit intake of product into the selected first number of openings.

6. The method of claim 5 further comprising receiving a second input to the other one of the first lever and the second lever and pivoting the other one of the first gate and the second gate in response to the second input to temporarily close access to a selected second number of opening of the roller to limit intake of product into the selected second number of openings.

7. The method of claim 6 further comprising the holding the one of the first gate and the second gate in the pivoted position until a first canceling input is received and further comprising holding the other one of the first gate and the second gate in the pivoted position until a second canceling input is received.

8. The method of claim 7 wherein the first gate and the second gate are held behind a portion of the product container when each is in the pivoted position.

9. The method of claim 6 wherein the first gate and the second gate are pivoted independently of one another about a shared shaft extending parallel to an axis of rotation of the roller.

\* \* \* \* \*